United States Patent [19]

Moore

[11] 4,281,504

[45] Aug. 4, 1981

[54] AUTOMATIC SAFETY CLUTCH DEVICE FOR FLEXIBLE DRIVES

[75] Inventor: Brian Moore, Stony Stratford, England

[73] Assignee: Pennwalt Corporation, Philadelphia, Pa.

[21] Appl. No.: 55,720

[22] Filed: Jul. 9, 1979

[51] Int. Cl.³ .................. A01D 75/18; F16D 3/56
[52] U.S. Cl. ........................ 56/10.3; 56/12.7; 192/56 R; 64/28 R; 64/2 R
[58] Field of Search .............. 64/28 R, 2 R, 1 S, 6, 64/7, 27 C, 275, 15 C, 4; 403/2; 192/56 R, 56 C; 56/10.3, 12.7, 295

[56] References Cited

U.S. PATENT DOCUMENTS

| | | | |
|---|---|---|---|
| 3,219,129 | 11/1965 | Yamada | 64/4 |
| 4,097,991 | 7/1978 | Proulx | 56/12.7 |
| 4,104,797 | 8/1978 | Ballas | 56/12.7 |
| 4,126,928 | 11/1978 | Hoff | 64/2 R |
| 4,188,719 | 2/1980 | Hoff | 56/12.7 |

*Primary Examiner*—Ira S. Lazarus
*Assistant Examiner*—Magdalen Moy

[57] ABSTRACT

A flexible drive transmits torque from a power source to a driven member, such as a power grinder or grass cutter. A safety clutch is interposed between the driven end of the flexible drive and the driven member to automatically disengage the flexible drive therefrom upon overload thereof by virtue of the flexible drive tending to coil up on itself when the driven member is overloaded, to thereby shorten the overall length of the flexible drive to effect a disconnection therebetween until the overload is removed.

7 Claims, 2 Drawing Figures

AUTOMATIC SAFETY CLUTCH DEVICE FOR FLEXIBLE DRIVES

STATEMENT OF THE INVENTION

The invention relates to an automatic safety clutch device for flexible drives which serves automatically to disconnect the drive when an overload arises.

BACKGROUND AND SUMMARY OF THE INVENTION

One problem which arises with flexible drives, particularly helically wound wire shafts of a type commonly used in a wide variety of tools and apparatus, is the tendency of the flexible drive shaft to curl up on itself under overload conditions, for example when the rotary head of a drilling or cutting tool encounters an obstruction. In the case of hands tools, this tendency of the flexible drive to coil up on itself when an overload occurs can result in danger to the operator.

Currently, when the cutting head meets an obstruction the operator has to disconnect the power source, free the cutting head from the obstruction and then reconnect the power source to the drive.

The present invention seeks to overcome this problem and makes use of the tendency of a wire wound flexible drive shaft to coil up on itself under overload conditions, thereby shortening the overall length of the shaft, to effect a temporary disconnection between the shaft and the driven, or driving member.

BRIEF DESCRIPTION OF THE INVENTION

Particularly, but not exclusively, the invention relates to an automatic safety clutch device for power driven hand tools, e.g. power drills, grass cutters, hedge trimmers and cultivators, incorporating a flexible drive between a hand held power source and an operating head, e.g. a drill chuck or a rotating or reciprocating blade assembly, one such hand tool, specifically a grass cutting attachment for a chain saw drive motor, being illustrated in U.S. Pat. No. 3,977,078.

Broadly speaking the present invention provides a flexible drive and automatic safety clutch assembly, said assembly comprising a flexible drive shaft connected or connectible at one end to a rotary power source and at the other to a driven member for the transmission thereto of rotational torque from the power source, and means for automatically disconnecting the power source from the driven member in the event of an overload, said disconnection means comprising a socket member mounted for rotation by the flexible drive shaft, a socket axially formed in said socket member and being of a non-circular cross-section, and axially engaging in said socket a complementary male member driven or drivable by said shaft, the arrangement being such that upon said overload, the reduction in the overall length of the flexible shaft caused by the tendency of the shaft to curl up on itself, is effective to withdraw said male member axially from said socket thereby to effect said disconnection.

Preferably, means are provided for automatically guiding the male member back into the socket upon release of the overload thereby to re-establish the rotary drive connection therebetween. Conveniently, this guide means takes the form of a nose extending axially from the end of the male member, the nose having a smaller cross-sectional dimension than the socket, so that when the male member disengages the socket the nose remains extending axially into the socket but rotating freely therein.

In a particularly preferred embodiment of the invention, the male member takes the form of an end connector of polygonal, preferably square, cross-section provided on the end of the flexible drive shaft.

DETAILED DESCRIPTION OF THE INVENTION

Figure 1:
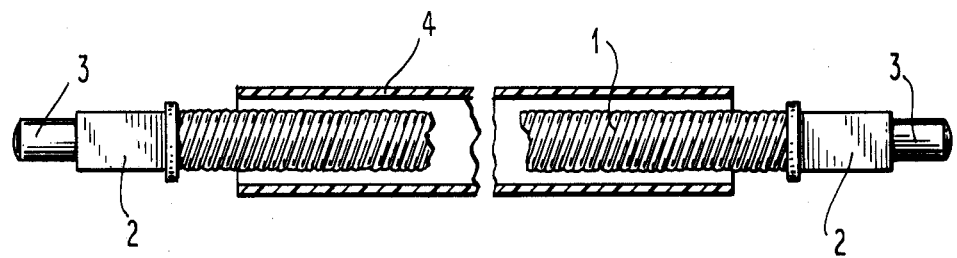
FIG. 1 is a longitudinal sectional view through a flexible drive shaft constructed for use in this invention.
Figure 2:
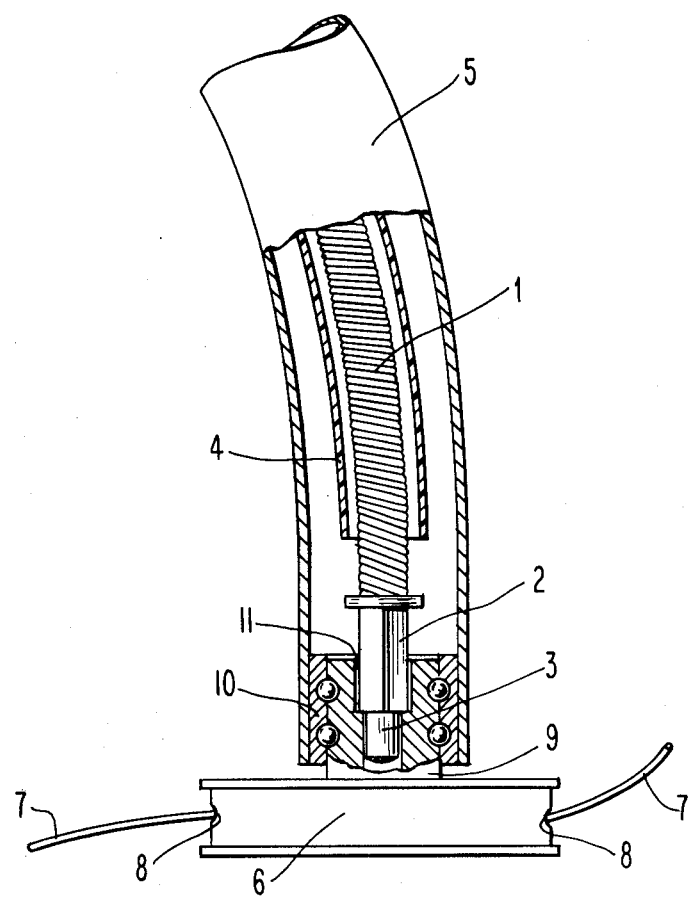
FIG. 2 is a diagrammatic sectional view through a grass-cutter attachment for a chain saw incorporating a flexible drive and automatic clutch assembly according to the invention.

Referring to the drawings, a conventional wire wound flexible drive shaft is shown adapted for use in accordance with this invention. The shaft comprises a helically wound wire core 1 rotatably mounted in known manner in a protective casing or sleeve 4, suitably nylon. Mounted on each end of the core 1 are male end connectors 2 of polygonal, preferably square cross-section. The end connector preferably, but not necessarily, has a nose 3 coaxial with the shaft, the nose having a diameter less than the cross-sectional dimension between the flats on the connector.

In known manner, the grass-cutter attachment comprises an elongated, downwardly curved, rigid tubular arm 5 adapted at its upper end (not shown) to be mounted on a chain saw drive, for example as shown in U.S. Pat. No. 3,977,078. Instead of a direct driving connection between the output shaft of the chain saw drive and the flexible drive shaft, an indirect drive connection may be employed, e.g. a chain drive and/or via a gear box assembly. The manner of mounting the attachment on the chain saw drive and the form of drive connection therebetween, is, however, no part of the present invention.

Rotatably mounted on the bottom end of the tubular arm 5 is a hollow drum 6 housing a length, or two lengths of a plastics cutting filament or thread 7, the ends of which project from the drum 6 through apertures 8. As the projecting ends of the cutting filament break off or are worn away, fresh lengths of cutting filament can be pulled from the interior of the drum.

The drum 6 is rotatably mounted on the bottom end of the tubular arm 5 via a stub shaft 9 supported in a roller or ball race 10 secured in the open end of the tubular arm 5.

The drum is driven from the power source (not shown) by the flexible drive shaft mounted inside the tubular arm 5. As the drum is rotated at high speed, the projecting filament ends 7 act as cutting blades to cut down long grass, nettles, brush-wood and other unwanted vegetation.

The connection between the core 1 of the flexible drive shaft and the drum 6 is made via an axial socket 11 formed in the end face of the stub shaft 9 and into which engages the connector 2 on the end of the flexible drive shaft. The outer end of the socket has a polygonal, e.g. square, cross-section corresponding to the cross-section of the connector 2 for the purpose of providing a rotary drive connection therebetween. A cylindrical counterbore in the stub shaft 9 receives the nose 3 of the connector.

During normal operating conditions, the rotary drive connection is maintained between the connector 2 and the socket 11 in the stub shaft 9. However, if the rotating drum encounters an obstruction, the above-described tendency of the flexible drive shaft 1 to coil up on itself and undergo overall shortening under overload conditions will cause the end connector 2 to retract and disengage from the socket 11 leaving just the nose 3 running freely within the outer end of the socket. As soon as the overload on the flexible drive shaft is relieved and the drum 5 removed from the obstruction, the flexible drive shaft will uncoil to its original length and the drive connection to the drum will be automatically re-established.

It will thus be seen that the invention provides, in an extremely simple manner, an automatic safety clutch between a flexible drive shaft and a driven rotary member. Of course, if desired the automatic safety clutch may be provided at the input end of the drive shaft rather than, or as well as, at the output end.

By closely relating the axial length of the flats on the connector and the internal diameter of the casing 4 of the shaft 1, which internal diameter limits the extent to which the shaft can coil up on itself, and hence limits the overall contraction of the shaft, close control of the torgue required to release the connection can be obtained.

The end connector on the flexible shaft, may of course be a female member with the complementary male member provided on the driven or the driving member as the case may be. Square end flexible shafting is known, for example, U.S. Pat. No. 3,485,079 for "quick disconnection" with appropriately shaped sockets, but not the principle of utilizing the tendency of the shaft to shorten during overload conditions to effect automatic disconnection and reconnection of the drive.

The automatic safety clutch device of the present invention may be utlized in a wide variety of hand tools and other apparatus employing a helically wound wire flexible drive shaft. For example, the rotating drum of the grass-cutting attachment described can be replaced by a rotary cultivating head or even by a reciprocating blade assembly as for example, in a hedge trimmer. Alternatively the present invention can be used in power tools incorporating a remote drive, in which tools for example, the flexible drive can be used to drive a drill chuck or a socket head as in a power spanner. These and other utilizations will be apparent without departing from the invention as defined hereinafter in the attached claims.

I claim:

1. A flexible drive and automatic safety clutch assembly, said assembly comprising a flexible drive shaft connected at one end to a rotary power source and at the other end to a driven member for the transmission thereto of rotational torque from said power source, and means for automatically disconnecting said power source from said driven member in the event of an overload, said disconnection means comprising a socket member mounted for rotation by said flexible drive shaft, a socket axially formed in said socket member, said socket having a non-circular cross-section and axially engaging therein a complementary male member driven by said shaft, the arrangement being such that upon said overload, reduction in the overall length of said flexible shaft caused by tendency of said shaft to curl up on itself is effective to withdraw said male member axially from said socket thereby to effect said disconnection, and other means for automatically guiding said male member back into said socket upon release of said overload thereby to re-establish the rotary drive connection therebetween.

2. An assembly according to claim 1, wherein said guide means takes the form of a nose extending axially from the end of the male member, the nose having a smaller cross-sectional dimension than the socket, such that upon disengagement of said male member from said socket, said nose remains extending axially into the socket but rotating freely therein.

3. An assembly according to claim 1 wherein said male member takes the form of an end connector of polygonal, preferably square, cross-section provided on said other end of said flexible drive shaft.

4. An assembly according to claim 2 wherein said male member takes the form of an end connector of polygonal, preferably square, cross-section provided on said other end of said flexible drive shaft.

5. A grass cutter comprising an elongated curved, rigid arm, a drum rotatably mounted at the end of said arm, a cutting filament projecting from said drum, and means for rotatably driving said drum, said drive means comprising a flexible drive and automatic safety clutch assembly, said assembly comprising a flexible drive shaft connected at one end to a rotary power source and at the other end to a driven member for the transmission thereto of rotational torque from said power source, and means for automatically disconnecting said power source from said driven member in the event of an overload, said disconnection means comprising a socket member mounted for rotation by said flexible drive shaft, a socket axially formed in said socket member, said socket having a non-circular cross-section and axially engaging therein a complementary male member dirven by said shaft, the arrangement being such that upon said overload, reduction in the overall length of said flexible shaft caused by tendency of said shaft to curl up on itself is effective to withdraw said male member axially from said socket thereby to effect said disconnection, and other means for automatically guiding said male member back into said socket upon release of said overload thereby to re-establish the rotary drive connection therebetween.

6. An assembly according to claim 5 wherein said guide means takes the form of a nose extending axially from the end of said male member, said nose having a smaller cross-sectional dimension than said socket, such that upon disengagement of said male member from said socket, said nose remains extending axially into the socket but rotating freely therein.

7. An assembly according to claim 5 wherein said male member takes the form of an end connector of polygonal, preferably square, cross-section provided on said other end of said flexible drive shaft.

* * * * *